United States Patent [19]

Mansour et al.

[11] 4,387,882
[45] Jun. 14, 1983

[54] CATTLE GUARD CONSTRUCTION AND METHOD

[76] Inventors: Alex E. Mansour, 320, Casa Loma La.; Jon D. Bridgwater, 530 S. Casa Loma La., both of Cedar City, Utah 84720

[21] Appl. No.: 257,888

[22] Filed: Apr. 27, 1981

[51] Int. Cl.³ .................. E01B 17/00; E01C 5/22
[52] U.S. Cl. .................................. 256/17; 404/73
[58] Field of Search ............... 256/14, 17, 18; 404/73; 49/131; 52/602

[56] References Cited

U.S. PATENT DOCUMENTS

| | | | |
|---|---|---|---|
| 551,971 | 12/1895 | Kennedy | 256/14 |
| 1,221,286 | 4/1917 | Burchard | 256/17 |
| 1,596,898 | 8/1926 | Smith . | |
| 2,471,551 | 5/1949 | Slaughter . | |
| 2,938,771 | 5/1960 | Luff . | |

FOREIGN PATENT DOCUMENTS 2009822  6/1979  United Kingdom ................. 256/17

Primary Examiner—Richard J. Scanlan, Jr.
Attorney, Agent, or Firm—Mallinckrodt & Mallinckrodt

[57] ABSTRACT

A cattle guard for highways and other thoroughfares, as an extension of a fence line to prevent cattle from crossing into forbidden areas, is made up of concrete slab sections faced with sheet steel and placed end-to-end across the thoroughfare. The sheet steel facing for each section is fabricated by interconnecting in side-by-side relationship a series of trough-like lengths of sheet steel or the like pre-bent to provide alternate, up-facing valleys and ridges and an undersurface to serve as a form having reverse valleys and ridges into and onto which is poured wet concrete to provide a structural concrete base for the section. The trough-like lengths are preferably interconnected by flanges extending integrally from respective sides of the valleys and overlapped to provide double thick, sheet steel traction surfaces for the upfacing ridges. Tie plates are provided to interconnect the slab sections and to facilitate handling and placement of the individual sections.

21 Claims, 6 Drawing Figures

CATTLE GUARD CONSTRUCTION AND METHOD

BACKGROUND OF THE INVENTION

1. Field

This invention is in the field of cattle guard construction as commonly employed to extend cattle fencing protection across highways without obstructing traffic using the highways.

2. State of the Art

Cattle guards across highways are normally provided by constructing a double layer of steel rail grillwork on stepped, reinforced concrete piers that are cast in place at opposite sides of the highway, the upper surface of the grillwork being substantially flush with the highway surface. In northern climates subject to snowfall in the winter season, widely spaced steel strips are secured to the upper surface of the grillwork in longitudinal alignment with the highway as slideways for accommodating snowplows. Triangularly shaped end guards slope, from securement at their bases to the piers, upwardly and outwardly to approximately fence height at their vertices. The resulting cattle guard structure prevents cattle from crossing the unfenced highway portion of the normally fenced property line on pain of having their feet and lower legs caught in the grillwork. Long experience has shown that cattle will not normally cross such highway cattle guards and that ranch owners can be quite effectively protected from having their cattle stray, even though ungated highways cross their property.

Despite the effectiveness of such cattle guards, the expense of construction is considerable, and cattle and other livestock do at times attempt to cross and cannot be extricated without injury. Moreover, sometimes people attempting to walk across such cattle guards have their feet caught between the rails of the grillwork.

An attempt has been made heretofore to avoid certain disadvantages of the usual highway cattle guard, see Slaughter U.S. Pat. No. 2,471,551 of May 31, 1949, by a cast-in-place construction utilizing a deeply corrugated metal sheet closely topping a conformingly shaped concrete base. Yet, the aforedescribed customary construction remains in widespread use, probably because the Slaughter construction is impractical from a commercial standpoint.

3. Objectives of the Invention

Principal objectives in the making of the present invention were to reduce considerably the expense of fabrication and time required for installation of a highway cattle guard by providing a highly practical cattle guard construction, to provide for additions to an existing cattle guard if and when a highway is widened, to provide for easy and relatively inexpensive replacement of damaged portions of a highway cattle guard following initial installation, to eliminate or greatly reduce the danger of animals or people becoming inextricably caught in a highway cattle guard, and to provide a method of handling precast concrete slab sections so they may be easily placed in juxtaposition by customarily available lifting equipment and thereafter fastened together as a substantially rigid, unitary structure.

BRIEF SUMMARY OF THE INVENTION

In accomplishing the foregoing objectives, a highway cattle guard of the invention comprises interconnected, precast, and easily handled concrete slab sections, each preferably factory prefabricated and hauled to the installation site for unloading and installation by use of customarily available equipment on prepared ground in a cut across an existing highway or at an appropriate location in a projected highway site. The individual sections have channeled working surfaces faced with structural sheet material, usually galvanized sheet steel, that is fabricated as individual, elongate, prebent, trough-shaped lengths with longitudinally extending flanges which overlay corresponding flanges of laterally adjoining lengths when placed side by side to provide a form structure. Concrete is poured into and onto the underside of such structure to provide a supporting slab base for the individual section, which base is usually strengthened by the provision of customary steel for reinforcing.

Although the form structure into and onto which the concrete is poured can be fabricated from variously shaped individual lengths in various ways, it is preferred that each of the individual lengths be bent to shape from a single elongate piece of sheet steel, forming a single, substantially U-shaped trough or valley with flanges extending laterally from and along respective lateral sides thereof so as to overlap adjoining flanges of next adjacent lengths in the assembled form and provide substantially flat ridges of double thickness as traction surfaces for vehicles which cross transversely of the valleys and ridges in the final cattle guard.

For handling and interconnecting purposes, each fabricated form has elongate, threaded connectors extending through the sheet steel and across down-facing reverse valleys at the underside of the form adjacent to respective corners thereof, with their ends projecting into the up-facing valleys which provide the cattle guard channels. Preferably, such connectors are unheaded bolts that are threaded at opposite ends for the reception of respective nuts and that extend through sleeves which are embedded in the concrete of the corresponding ridges. As so arranged, not only can tie plates be secured in place across the end-to-end abutting slab sections for connecting such sections together or to the usual upwardly and outwardly sloping, triangular end guards at opposite ends of the cattle guard construction, but such tie plates or similar lifting members may be secured to the projecting ends of the threaded connectors for temporary engagement by a lifting rig during handling and placement of the individual slab sections.

THE DRAWINGS

An embodiment of cattle guard representing the best mode presently contemplated for carrying out the invention is illustrated in the accompanying drawings, in which:

FIG. 1 represents a perspective view of the cattle guard of the invention as made up of three precast concrete slab sections installed across a highway, the view being taken from an end thereof at one side of the highway before installation at that end of the usual, upwardly sloping, triangular, end guard corresponding to that shown connected with the fence at the other end of the cattle guard;

FIG. 2, a fragmentary, transverse, vertical section taken along the line 2—2 of FIG. 1 and drawn to a larger scale;

FIG. 3, a fragmentary, longitudinal, vertical section taken along the line 3—3 of FIG. 1 and drawn to a scale larger than FIG. 1 but smaller than FIG. 2;

FIG. 4, a fragmentary vertical section taken along the line 4—4 of FIG. 3 and drawn to a scale larger than that of FIG. 3 or FIG. 2;

FIG. 5, a fragmentary, longitudinal, vertical section taken along the line 5—5 of FIG. 1, drawn to the scale of FIG. 4 and showing by broken lines how lift members may be used in alternate positions for lifting purposes if desired; and FIG. 6, a fragmentary, transverse, vertical section taken along the line 6—6 of FIG. 5 showing how the end guards are connected to the cattle guard end sections making use of the lift members for those sections.

DETAILED DESCRIPTION OF THE ILLUSTRATED EMBODIMENT

Figure 1:
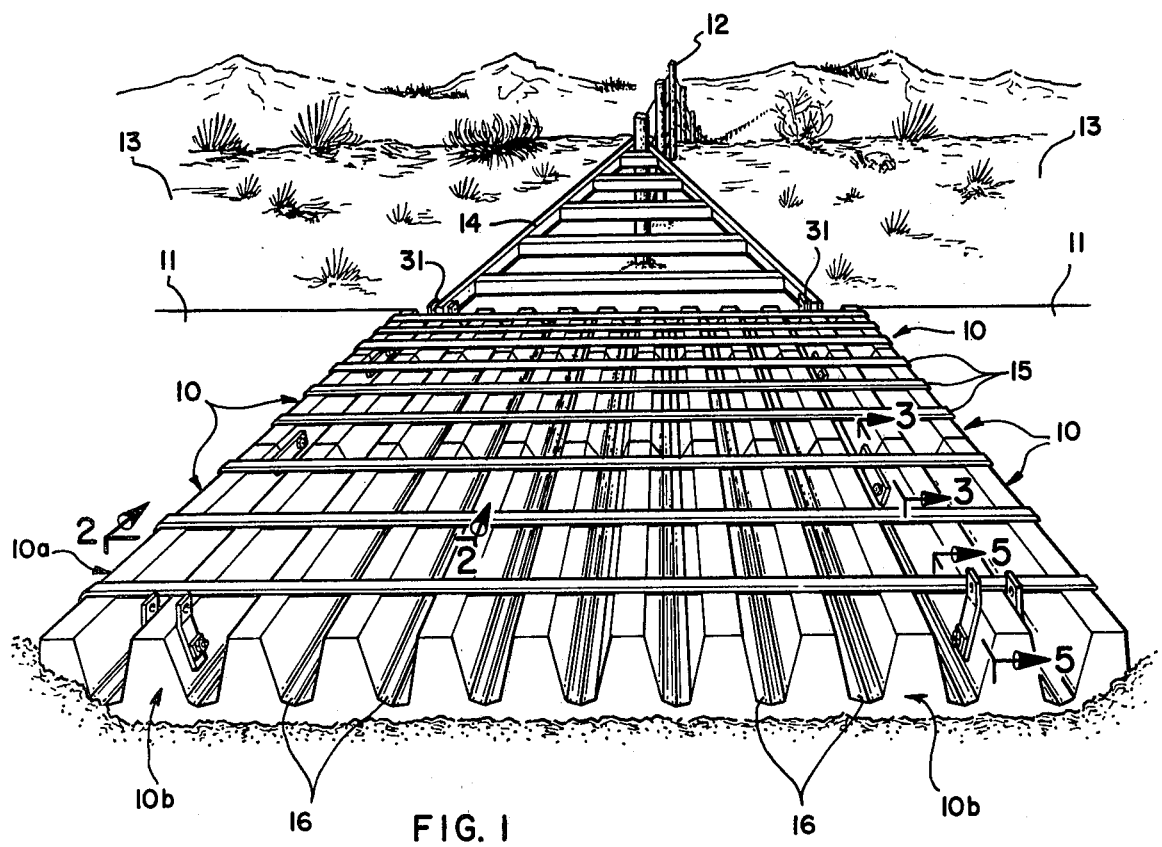

In the form illustrated, the cattle guard of the invention is constructed from precast, rectangular, concrete, slab sections 10, FIG. 1, placed in end-to-end abutting relationship across a highway 11 as an extension of fencing 12 provided for confining cattle and other livestock in one or the other or both grazing areas 13, respectively. Usual, upwardly sloping, triangular, end guards 14 are utilized to connect with the fencing 12 at opposite sides of the highway, and widely spaced steel strips 15 are secured to the upper surfaces of the cattle guard sections 10 in longitudinal alignment with highway 11 as slideways for snowplows, as is customary in northern geographical areas.

The term "highway" is used herein to indicate any thoroughfare over which a property or other demarcation line extends that should not be crossed by cattle. This includes country roads as well as major highways, entry and exit ramps to and from freeways, pedestrian paths, railroad tracks, etc.

Each of the slab sections 10 comprises a sheet steel form component 10a, and a concrete slab component 10b produced by pouring wet concrete into and onto the underside of the form component. The form component 10a is fabricated as a unitary structure by arranging, in side-by-side, overlapping relationship, a series of mutually similar, trough-like lengths 16 of sheet steel, each bent to provide an elongate, preferably upwardly divergent, substantially U-shaped trough or valley member 17 and lateral flange members 18 and 19 extending longitudinally along opposite edges, respectively, of the trough or valley member. The flange members of adjoining trough-like lengths 16 overlap to provide traction members 20 of double thickness for the slab section. Such flange members 18 and 19 preferably have their free edge margins 18a and 19a downturned, so the overlapped flange members nest closely as illustrated.

The sheet steel, form component 10a provides a series of mutually parallel, up-facing valleys 20 alternating with upstanding ridges 21, which are formed respectively by the sets of overlapping flanges serving as elongate structural sheet material interconnecting the trough-like lengths 16 and providing traction surfaces for the cattle guard. It should be realized that, while galvanized sheet steel of appropriate gauge, usually from twelve to sixteen gauge, is the preferred sheet material for the form components, other types of tough and durable sheet material may be employed and given the required shape in various ways. Moreover, the trough like lengths 16 may be formed as only the valleys 17, without integral flanges, and may be interconnected by separate pieces of the elongate structural sheet material to provide the unitary form component, though this is not recommended considering fabricating techniques commonly employed.

In fabricating the form component 10a, it is advantageous to utilize steel strips 15 that are provided with depending, elongate, threaded studs 15a at appropriate intervals along their lengths as means for securing the sheet material between valley members, i.e. the overlapping flanges 18 and 19, in place and the entire form structure together during pouring of the wet concrete into the reverse valleys formed between the normally up-facing valleys 20. Nuts 22 are threaded onto the studs 15a, respectively, and are cinched tightly against the overlapped flanges, leaving the major portions of the lengths of such studs to be encased in the concrete of the slab base 10b that fills the reverse valleys and supports the ridges 21 between the valleys 20 of the slab section 10 and to serve as tie-ins between form and slab components of such slab section.

Figure 4:
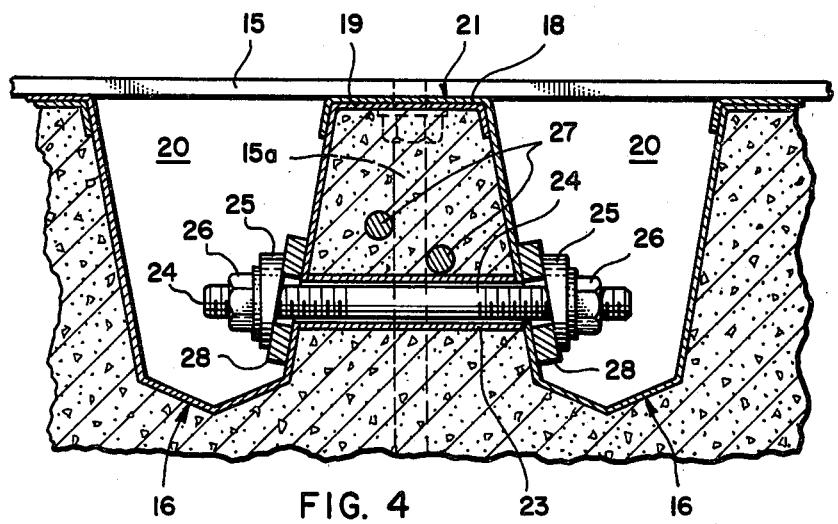
Figures 5, 6:
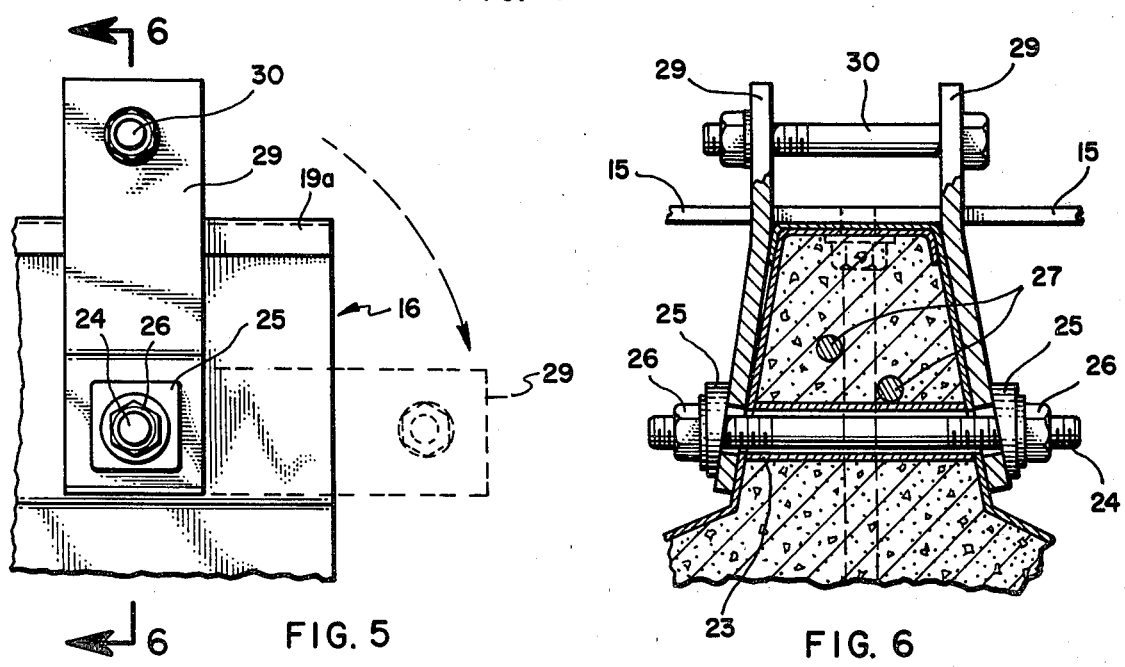

After fabrication of the concrete-receiving form component 10a of each concrete slab unit or cattle guard section 10 by securing prebent, trough-like lengths 16 of sheet steel together by means of the studs 15a of steel strips 15, such form component is placed horizontally in a suitable form box (not shown) with its underside facing upwardly so that the reverse valleys between valleys 20 are facing upwardly. The open ends of such reverse valleys and the sides of the form component are temporarily closed by the form box to a height sufficient to provide the desired slab thickness for the concrete base component 10b of the slab unit or cattle guard section 10, and wet concrete is poured into and onto the inverted form component 10a to provide such concrete base component 10b. Before pouring of the concrete, however, provision is made for interconnecting the slab units or cattle guard sections 10 together by placing structural tie means adjacent to the respective corners thereof. Such means preferably take the form of galvanized steel sleeves 23, FIGS. 4 and 6, that are inserted across the reverse valleys, respectively, through receiving openings provided in corresponding valley walls of the trough-like lengths 16, so as to accept threaded belt-like connector rods 24, beveled washers 25, and nuts 26 following setting and curing of the wet concrete.

Steel bar reinforcement 27 for the concrete may be put in place before or during the pouring of the concrete. It is advantagious that the studs 15a be sufficiently long to extend past such steel bars and provide support therefor by means of tie wiring (not shown). Moreover, as so extended, such studs 15a provide resistance to bending forces imposed by vehicles crossing the cattle guard.

Figure 3:
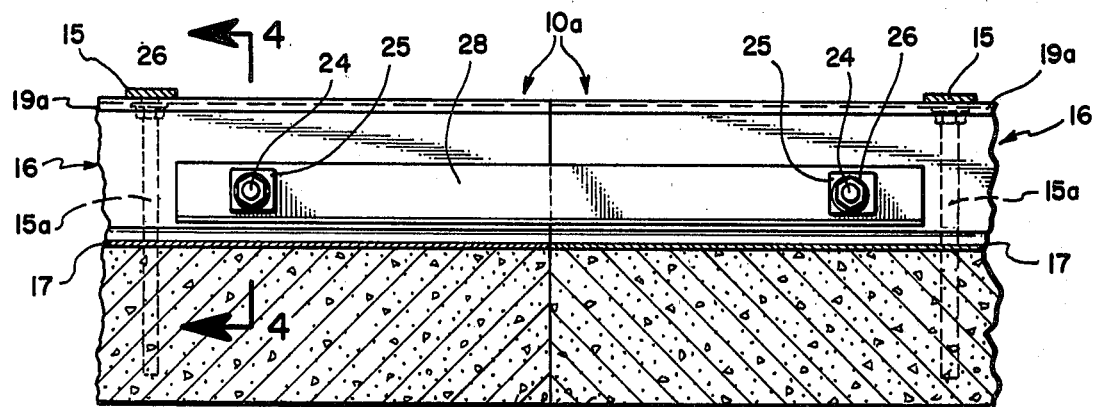

A feature of the invention is the provision for handling the precast, concrete slab units or cattle guard sections 10 by equipment ordinarily used in shops and by contractors, such as cranes or other types of lifting rigs. For this purpose, lifting members are provided in conjunction with the structural tie means associated with the corners of such units or sections 10. The lifting members may be elongate tie plates 28, as used for interconnecting end-to-end abutting sections in the cattle guard construction, as in FIG. 3, or they may be shorter tie plates 29 configurated to extend upwardly along and beyond the heights of the ridges 21, as in FIGS. 5 and 6, and to interconnect an end section 10 with the corresponding end guard 14. In both instances, such tie plates are provided with openings, as at 30, FIGS. 5 and 6, for receiving the bolt-like connectors 24. For lifting purposes in both handling and placing of slab sections 10, tie plates 29 are preferably used at all four corners of each section, with removable bolts 30 passing through the free sets of openings, respectively, for engagement by lifting cables. Depending upon lifting convenience, pairs of either tie plates 28 or 29 may extend outwardly from one or both ends of a slab section to be similarly engaged by lifting cables.

Upon placement of the required number of slab sections 10 in end-to-end alignment across a highway, as in FIG. 1, elongate tie plates 28 are applied across the end-to-end joinders and are tightly secured by respective connector rods 24 and nuts 26. At the ends of the cattle guard construction, upstanding tie plates 29 are secured, at one set of ends, to the end slab sections by respective connector rods 24 and nuts 26 and, at the other set of ends, by bolts 31 to the lower ends of the triangular end guards 14, respectively, as indicated in FIG. 1.

Figure 2:
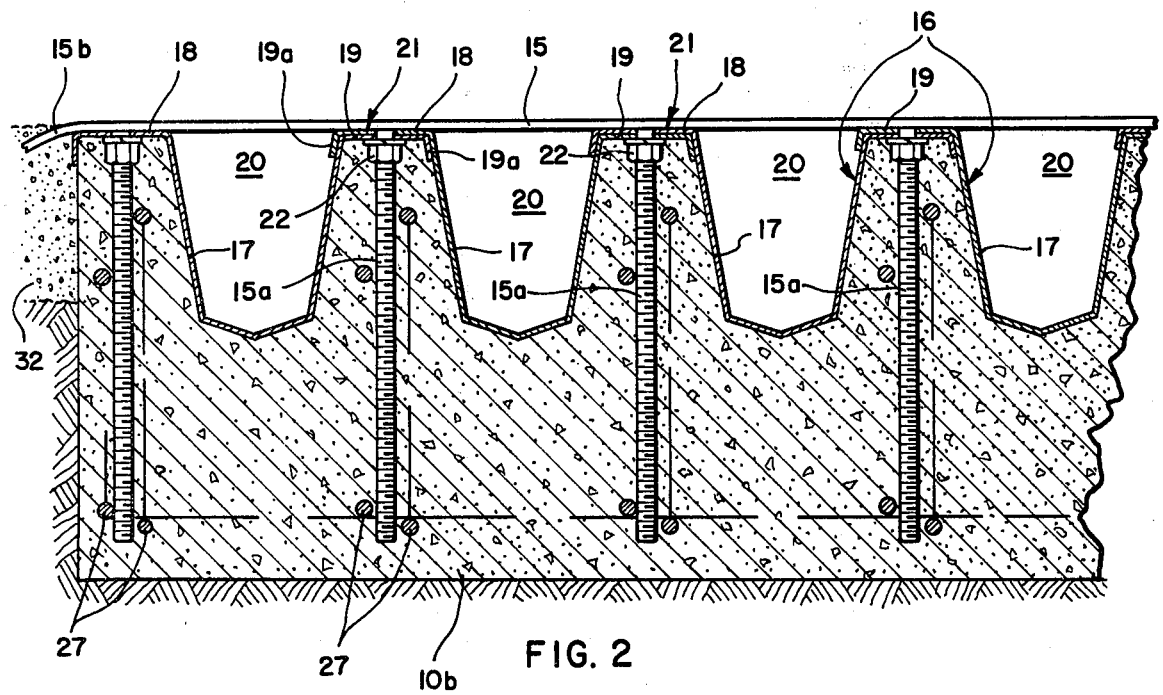

As installed in a transverse cut of suitable width across an existing highway or during the construction of a highway, the ends of strips 15, see 15b, FIG. 2, are downturned and buried in the highway surfacing material 32, which may be any of the usual types, such as asphalt, concrete, gravel, etc.

It should be noted that the upwardly divergent valleys 20 of the cattle guard are preferably sufficiently wide to preclude wedging therein of the hooves of cattle or other livestock which may attempt to cross such cattle guard.

Although the slab sections are usually of rectangular formation as illustrated, there are instances where other geometric forms will be desirable as will be apparent to those skilled in the art.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A highway cattle guard, comprising precast, individual, concrete slab sections aligned in end-to-end relationship across a highway as an extension of cattle-confining fencing, each of said sections comprising a side-by-side series of individually formed, trough-like lengths of structural sheet material, each of which is formed to provide an elongate valley member; elongate structural sheet material interconnecting the trough-like lengths as ridges between the valleys thereof and providing up-facing traction surfaces for vehicles crossing the cattle guard transversely of the valleys and ridges; a structural concrete base for each of said sections precast integrally into the reverse valleys formed along the underside of the interconnected lengths and extending thickly below the valleys as a supporting slab base therefor integral with the remainder of said concrete base; and means securing the interconnecting sheet material in place.

2. A highway cattle guard in accordance with claim 1, wherein each of the trough-like lengths is formed with longitudinally extending flange members integral therewith at respectively opposite sides of the valley member as the sheet material interconnecting said lengths; and wherein the flange members of adjoining trough-like lengths are overlapped to provide traction ridges of double thickness.

3. A highway cattle guard in accordance with claim 2, wherein free edge margins of the overlapped flange members are downturned and such overlapped flange members are nested relative to each other.

4. A highway cattle guard in accordance with claim 2 or 3, wherein the overlapped flange members are flat, providing a series of relatively narrow but flat traction strips interposed between valleys and substantially flush with the highway running surface.

5. A highway cattle guard in accordance with claim 1, wherein the valleys are approximately U-shaped in cross-section, with outwardly sloping side walls and respective bottoms of width precluding wedging of the hooves of cattle therein.

6. A highway cattle guard in accordance with claim 1, wherein the precast concrete sections are interconnected at their ends by structural means that tie said sections together into a substantially rigid unit.

7. A highway cattle guard in accordance with claim 6, wherein the tying structural means comprise tie plates at opposite sides of respective ridges adjacent to corners of the sections, and threaded connectors extending through said tie plates and ridges and secured in place by nuts at their respective ends.

8. A highway cattle guard in accordance with claim 7, wherein the tying structural means also includes respective sleeves positioned across reverse valleys and encased by the concrete base; and wherein the threaded connectors extend freely through the sleeves, respectively.

9. A highway cattle guard in accordance with claim 7, wherein there are also included upwardly sloping, triangular, end guard sections joining the cattle guard with cattle-confining fencing at opposite sides of the highway, said end guard sections being interconnected with the concrete slab sections at opposite ends of the series thereof by tie plates and threaded connectors at said opposite ends of the series.

10. A highway cattle guard in accordance with claim 1, wherein relatively narrow and elongate structural guard strips extend in mutually spaced relationship transversely across the ridges and valleys; and wherein the means securing the interconnecting sheet material in place are threaded studs depending from said guard strips through the structural sheet material of selected ridges and by nuts threaded on said studs, said studs and nuts being encased by the concrete base.

11. A highway cattle guard in accordance with claim 10, wherein the studs extend through the greater part of the thickness of the concrete base, and wherein reinforcing bars are provided in said base and anchored to said studs.

12. For use in a highway cattle guard, an individual, precast concrete slab section comprising a side-by-side series of individually formed, trough-like lengths of structural sheet material each of which is formed to provide an elongate valley member; elongate structural sheet material interconnecting the trough-like lengths as ridges between the valleys thereof and providing up-facing traction surfaces for vehicles crossing the cattle guard transversely of the valleys and ridges; a structural concrete base for each of said sections precast integrally into the reverse valleys formed along the underside of the interconnected lengths and extending thickly below the valleys as a supporting slab base therefor integral with the remainder of said concrete base; and means securing the interconnecting sheet material in place.

13. A precast concrete slab section in accordance with claim 12, wherein each of the trough-like lengths is formed with longitudinally extending flange members integral therewith at respectively opposite sides of the valley member as the sheet material interconnecting said lengths; and wherein the flange members of adjoining trough-like lengths are overlapped to provide traction ridges of double thickness.

14. A precast concrete slab section in accordance with claim 13, comprising means for tying said slab section in end-to-end substantially abutting relationship with similar concrete slab sections, said means including threaded connectors extending through the tie plates and ridges at respective corners of the section with opposite ends thereof projecting into the valleys laterally adjacent to the respective ridges.

15. A method of constructing a highway cattle guard utilizing precast concrete slab sections in accordance with claim 14, comprising temporarily securing, to the projecting opposite ends of respective threaded connectors, lifting members that extend free and clear of said concrete slab section; attaching a lifting rig to the lifting members; moving said concrete slab section as may be required for transportation or construction of the highway cattle guard by power means applied to said lifting rig; and removing at least said lifting rig when placement of said concrete slab section in the highway cattle guard construction has been completed.

16. A method in accordance with claim 15, wherein the lifting members at one end of the slab section are left in place; an upwardly sloping, triangular, end guard section is provided to join the cattle guard with cattle-confining fencing; and said lifting members are interconnected with said end guard section.

17. A method of fabricating a concrete slab section for use in the construction of a highway cattle guard, comprising forming individual trough-like lengths of structural sheet material to provide respective valleys; joining a plurality of said lengths together in side-by-side relationship as a concrete-receiving form to provide ridges and reverse valleys between respective valleys; placing structural tie means adjacent the corners of said form, spanning corresponding reverse valleys; pouring a concrete mix into the reverse valleys of said forms and onto the reverse face of the valley-forming sheet material to provide a unitary concrete slab base for the concrete slab cattle guard section; and setting the poured concrete into a solid slab before placing the so-fabricated cattle guard section into a cattle guard construction.

18. A method in accordance with claim 17, wherein the ridges are formed by flanges extending longitudinally and laterally of the respective valley lengths, formed integrally therewith, and overlapped to provide double thick traction members.

19. A method in accordance with claim 17, wherein the structural tie means are sleeves extending between and having their ends fitted into corresponding openings in the valley-forming sheet material, so as to receive threaded connectors during construction of a highway cattle guard.

20. A highway cattle guard, comprising precast, individual, concrete slab sections aligned in end-to-end relationship across a highway as an extension of cattle-confining fencing, each of said sections comprising a side-by-side series of separate lengths of structural sheet material, each of which lengths is formed to provide a valley and to interconnect with sidewise adjoining lengths to provide sidewise adjoining valleys and reverse valleys at opposite faces of the section with ridges therebetween; means securing said lengths together in their adjoined relationship; concrete cast into place onto and against a face of the sections and into corresponding valleys of the individual lengths of the said series covering corresponding ridges and providing a structural concrete base that is wholly integral and that includes a supporting slab base in common with all of the lengths of said series, the other ridges providing up-facing traction surface for vehicles crossing the cattle guard transversely of the valleys and ridges.

21. For use in a highway cattle guard, a precast concrete slab section comprising a side-by-side series of separate lengths of structural sheet material, each of which lengths is formed to provide a valley and to interconnect with sidewise adjoining lengths to provide sidewise adjoining valleys and reverse valleys at opposite faces of the section with ridges therebetween; means securing said lengths together in their adjoined relationship; concrete cast into place onto and against a face of the sections and into corresponding valleys of the individual lengths of the said series covering corresponding ridges and providing a structural concrete base that is wholly integral and that includes a supporting slab base in common with all of the lengths of said series, the other ridges providing up-facing traction surfaces for vehicles crossing the cattle guard transversely of the valleys and ridges.

* * * * *